United States Patent [19]

Werner

[11] Patent Number: 4,943,973

[45] Date of Patent: Jul. 24, 1990

[54] SPREAD-SPECTRUM IDENTIFICATION SIGNAL FOR COMMUNICATIONS SYSTEM

[75] Inventor: Jean-Jacques Werner, Holmdel, N.J.

[73] Assignee: AT&T Company, Murray Hill, N.J.

[21] Appl. No.: 331,933

[22] Filed: Mar. 31, 1989

[51] Int. Cl.⁵ .............................................. H04K 9/00
[52] U.S. Cl. ....................................................... 375/1
[58] Field of Search ........................ 375/1; 342/13, 457

[56] References Cited

U.S. PATENT DOCUMENTS

| | | | |
|---|---|---|---|
| 4,355,399 | 10/1982 | Timor | 375/1 |
| 4,665,404 | 3/1987 | Christy et al. | 375/1 |
| 4,721,958 | 1/1988 | Jenkin | 342/13 |
| 4,740,792 | 4/1988 | Sagey et al. | 342/457 |
| 4,752,939 | 6/1988 | Amoroso et al. | 375/1 |
| 4,811,357 | 3/1989 | Betts et al. | 375/1 |
| 4,843,612 | 6/1989 | Brusch et al. | 375/1 |

Primary Examiner—Salvatore Cangialosi
Attorney, Agent, or Firm—David R. Padnes

[57] ABSTRACT

A spread-spectrum signal which conveys identifying information for an associated information signal is superimposed on the associated signal and transmitted therewith. Such identifying information distinguishes between voice and data information signals and between different types of data information signals. Such identification can be used for a variety of purposes within a communications network, such as facility and equipment selection, equipment disablement and bypass, setting communications parameters, e.g., speed, and inhibiting communications upon fault detection.

23 Claims, 5 Drawing Sheets

SPREAD-SPECTRUM IDENTIFICATION SIGNAL FOR COMMUNICATIONS SYSTEM

TECHNICAL FIELD

The present invention relates to communications systems and, more particularly, to the use of a spread-spectrum signal for identifying an associated information signal and classifying the information signal into one of a plurality of communication modes.

BACKGROUND OF THE INVENTION

Communications networks propagate information signals through a complex array of apparatus. Such information signals include voice and data, with the latter originating from a virtually limitless number of information sources, such as facsimile, text, video, etc. The communications media used in such networks can be homogeneous or diversified and presently include wire, optical fiber, radio, satellite and submarine cable.

The different types of information signals conducted through the network combined with the myriad of dissimilar types of network apparatus give rise to situations in which system performance is impaired. Such situations, in the main, arise in the context of the transmission of data as opposed to voice signals and, in particular, to the transmission of high-speed data signals. For example, the telecommunications networks include echo suppressors and cancellers necessary for long-haul voice communications which are incompatible with certain types of data communications. Or, for example, the network includes certain digital coding and decoding devices (codecs) which do not operate harmoniously with data transmission above a certain rate. Or, in still another example, digital networks include apparatus which rearranges incoming groups of digital channels carrying voice and data information into different outgoing groups and such apparatus requires complex signal conditioning applied to the digital channels conveying data when such channels constitute more than a predetermined percentage of the incoming digital channels.

One solution to the problem of incompatibility between certain information signals and specific types of communications apparatus is to route the troublesome information signals through segregated networks, also known as private-line networks, which are especially reserved and "conditioned" for such signals. Conditioning is a term which denotes that a communication facility has been engineered to assure no more than some preselected amount of signal impairment. While such segregation provides a satisfactory solution, the cost of such networks, especially the cost of conditioning, can exceed the objectives of certain system applications.

Another solution for certain forms of the referenced incompatibility problem is to transmit a tone to identify data signals. For example, a 2100 Hertz tone, as presently defined in the CCITT V.25 standard, is presently transmitted to identify a data signal and, depending on the phase characteristic of this tone, to disable echo suppressors or to disable both echo suppressors and echo cancellers. While this technique also works satisfactorily for certain system applications, the tone must be transmitted for a minimum time period so as to be able to distinguish between the tone and a naturally occurring speech harmonic. This minimum time interval makes the use of tones incompatible for use with fast start-up modem procedures. In addition, use of the tone as an information signal identifier with many present "standard" transmission schemes requires a revision of such schemes to accommodate the transmission of a tone in an already occupied time span. Such revision is difficult, if not impossible, to obtain.

In light of the foregoing, it can be seen that the problem of incompatibility between certain types of information signals and network apparatus has not been optimally solved and a variety of solutions have been developed which are not acceptable for all system applications. With the burgeoning growth of data carried by communications networks, it would be extremely desirable if a universally applicable technique could be devised which could improve the present situation.

SUMMARY OF THE INVENTION

In accordance with the present invention, a spread-spectrum signature signal is used to identify an information signal. Identification may include distinguishing between voice and data signals as well as distinguishing between different kinds of data signals. This identification can then be used to assign the identified information signal to one of a plurality of communication modes. Such an assignment could produce many effects. For example, an assignment could be used to route an information signal through the most compatible communication facility or equipment available, or to selectively bypass or disable equipment as a function of the assigned mode, or to control the operating characteristics of such equipment, etc.

The signature signal is superimposed over the associated information signal spectrum. Advantageously, such superposition does not alter the time scheme of the information signal. Therefore, a spreadspectrum signature signal can be added to any "standard" transmission scheme without modification of the latter and without noticeable degradation in performance.

DETAILED DESCRIPTION

Figure 1:
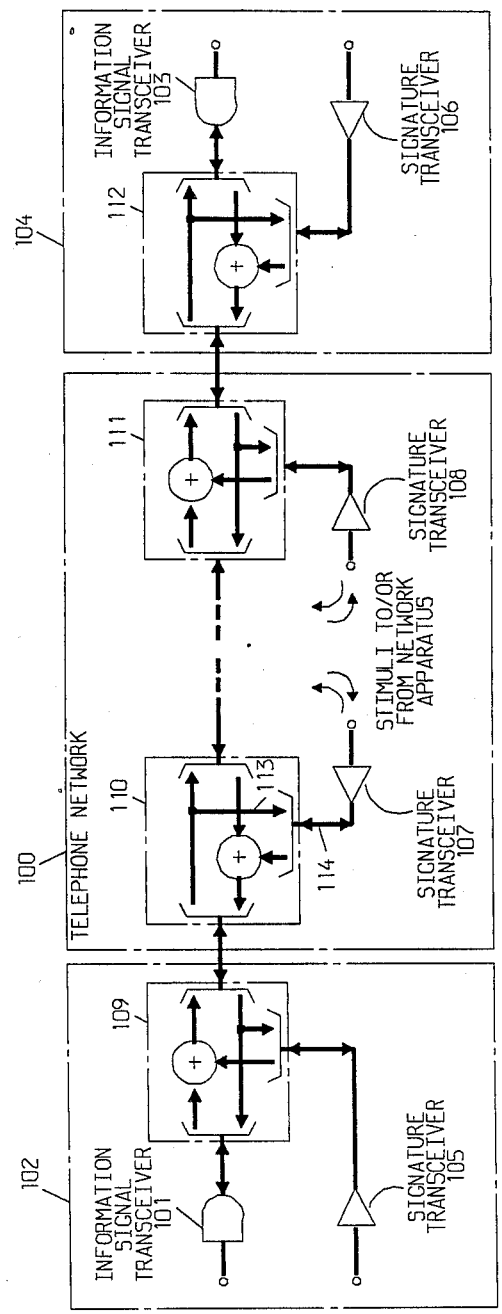
FIG. 1 is a block diagram illustrating the principle of the present invention.

The present invention can best be understood with reference to the illustrative communications system in FIG. 1. As shown, the telephone network 100 provides a bidirectional communications path between information signal transceiver 101 (transmitter/receiver) at a first location 102 and information signal transceiver 103 at a second location 104. The exact structure of transceivers 101 and 103 can take any of a variety of well-known forms and in this regard it should be noted that the present invention is applicable to any type of information signal, i.e., voice or data, and any form of such a signal, i.e., analog or digital. Moreover, there is no restriction on any particular modulation format or on whether the signal communications system is baseband or passband, bidirectional or unidirectional.

The particular communications facility (not shown) within network 100 through which the information signals between transceivers 101 and 103 are routed is typically selected by the network, and a large number of different routes is possible. Furthermore, it will be assumed that some of the possible routes are not optimal for the transmission of the particular information signals operated upon by transceivers 101 and 103. In accordance with the invention, the transmission impairments which would likely result from the selection of such non-optimal routing for these particular information signals is avoided by transmitting a spread-spectrum signature signal along with each information signal to identify the same. An identification, at a minimum, encompasses distinguishing between voice and data information signals and can also include distinguishing between data signals based on one or more preselected characteristics, e.g., data rate and/or full duplex vs. half duplex, etc.

At a receiver, the transmitted spread-spectrum signature signal is recovered and can be used to assign the associated information signal to one of a plurality of communication modes. Such an assignment can have many effects and some illustrative effects will be discussed hereinbelow. At this point, however, it can be said that the assignment of the information signal, using the associated spread-spectrum signal, makes a communications decision about the information signal.

Each of a plurality of signature transceivers 105-108 in FIG. 1 has the capability to transmit and receive spread-spectrum signature signals. At location 102, signature transceiver 105 generates a spread-spectrum signature signal associated with the information signal transmitted by information signal transceiver 101. This spread-spectrum signal is superimposed onto the transmitted information signal from location 102 via an adder in node 109. The signature signal from transceiver 105 is received by signature transceiver 107 within network 100 and/or signature transceiver 106 at location 104, depending on the application, wherein it is used to assign the associated information signal to one of a plurality of communication modes. In similar fashion, signature transceiver 106 generates a spread-spectrum signal associated with the information signal generated by information signal transceiver 103 and superimposed thereon using an adder in node 112. This signature signal is received by signature transceiver 108 within network 100 and/or signature transceiver 105 at remote location 102, depending on the application, and is used to assign the information signal from location 104 to one of a plurality of communication modes. The signature transceiver at each of locations 102 and 104 can also receive spread-spectrum signals and provide an assignment of an associated information signal to one of a plurality of communication modes in response to a spread-spectrum signature signal generated by signature transceiver 107 or 108 in network 100 and coupled through node 110 or 111, respectively. Accordingly, a spread-spectrium signal can be viewed as providing one or more stimuli to and from network 100 and to and from each of locations 102 and 104.

Finally, it should be noted that while a spread-spectrum signature signal from any of signature transceivers 105-108 is added to an associated information signal by an adder in nodes 109, 112, 110 and 111, respectively, a signal received by these signature transceivers does not pass through the adder in the respective node. In this regard, note that signal lead 113 in node 110 is directly coupled through lead 114 to signature transceiver 107 and does not pass through the adder in node 110.

Figure 2:
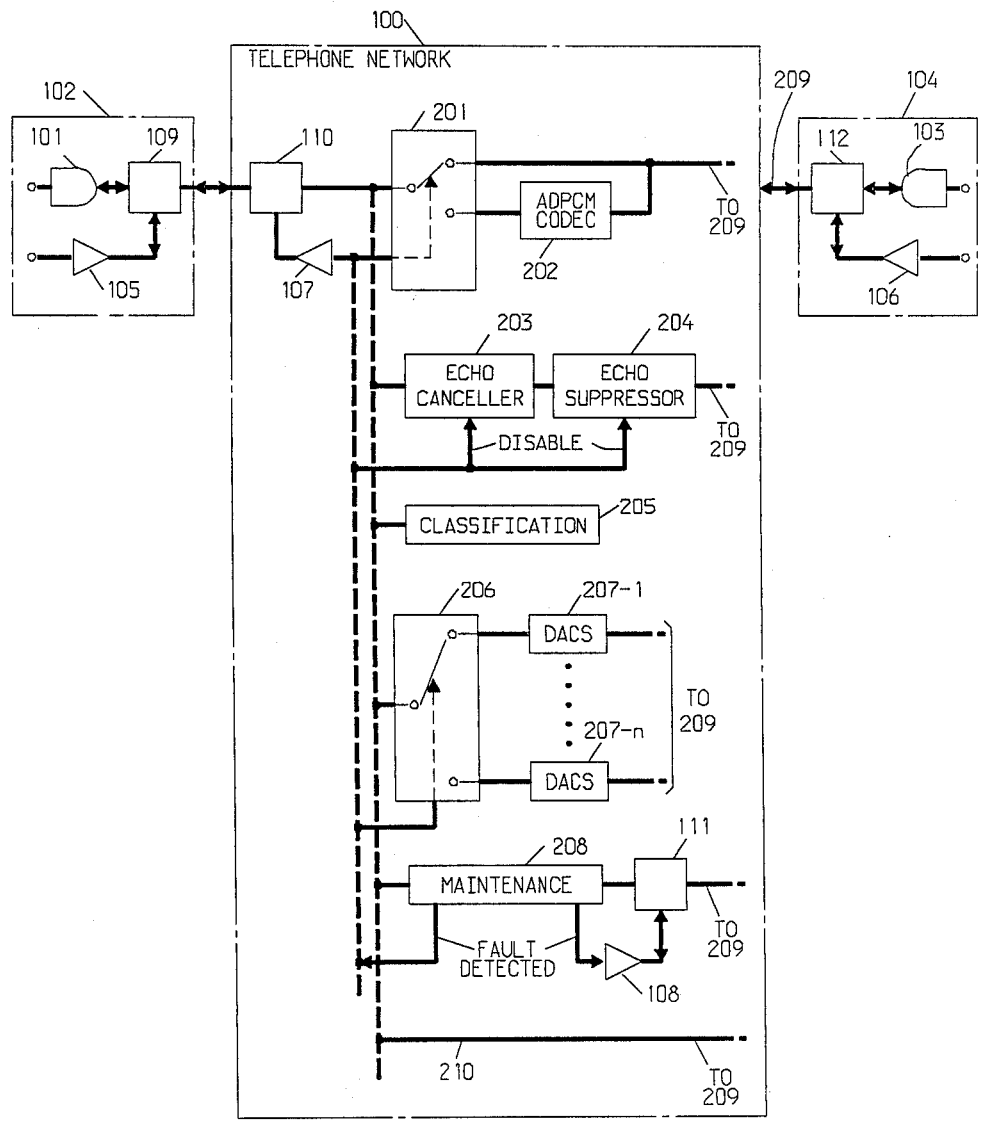
FIG. 2 is a block diagram illustrating several possible applications of the present invention.

Refer now to FIG. 2 which illustrates, in more detail, six exemplary outcomes from the assignment of an information signal into a particular communications mode. Lead 209 represents the communications facility directly connected to node 112. In the first arrangement, the "despread" signature signal at the output of transceiver 107 is used to control switch 201 which couples the information signal from transceiver 101 through ADPCM codec 202 or, alternatively, around it. Such bypassing is desirable for data signals having data rates of 12 kilobits/sec or more. In the second arrangement, the signature signal from transceiver 107 is used to selectively disable echo canceller 203 and/or echo suppressor 204. This selective disablement can be used in conjunction with modems which incorporate a fast start-up procedure or conform to some existing communications standard and, therefore, cannot or do not incorporate the tone defined in the CCITT V.25 standard. These echo control devices are essential for long-distance voice connections as they remove echoes generated in the network that are objectionable to telephone customers. However, these devices create problems, for example, for transmission applications using modems which internally provide such cancellation. Another application is to use the signature signal for network traffic studies which are routinely performed for a variety of purposes, such as load balancing and predicting the demand for different communications services and facilities. This application is represented by the coupling of the signature signal to classification device 205 which would identify the associated information signal and assign it to one of a number of preselected categories. Device 205 would also keep a tally of the number of information signals assigned to each category. In still another application, the signature signal from transceiver 107 would be used to distribute data signals to n different sets of Digital Access Cross-connect System (DACS) equipment 207-1 through 207-n, which receive a plurality of digital facilities and rearrange these digital channels among a plurality of output digital facilities. Such cross-connect equipment utilizes signalling techniques which, while not detrimental to voice communications, can impair transmission performance if the percentage of data channels in the mix of incoming voice and data channels exceeds some prescribed limit and signal conditioning is not provided. Accordingly, the signature signal could be used by a DACS controller, represented by switch 206, to distribute data signals across different DACS so that the prescribed limit was not exceeded and the need for signal conditioning is avoided. In still another scenario, maintenance equipment 208 which monitors network performance could generate an inhibit transmission signal whenever a serious communications fault was detected. This fault signal would be fed to signature transceivers, such as 107 and 109, and coupled back to the information signal source locations. At these locations, signature transceivers, such as 105 and 106, would extract the inhibit transmission signal and couple the same to their associated information signal transceivers which, in response thereto, would inhibit transmission until the fault was corrected. Finally, in the last arrangement, illustrated by line 210, the signature signal would be coupled between remote locations 102 and 104 where it would be used to identify the type of information signal transceiver being used. One possible use for this equipment identification is in the voiceband modem arena. In this application, the information signal transceivers 101 and 103 would be modems and the identification of each modem to the other via signature transceivers 105 and 106 could permit these modems to alter their rate of operation to some other data rate when such modems have this capability. Another application for equipment identification is in communications services, such as DDS (Digital Data Services) where the information signal transceivers 101 and 103 would be Digital Communication Units (DCUs). In the DDS application, the signature signal can be coupled between a remote location and the network, e.g., between signature transceivers 105 and 107, to indicate a request to change the current data rate. This request allows the network to more efficiently utilize its communication facilites with the potential for reduced cost to the customer.

Figure 3:
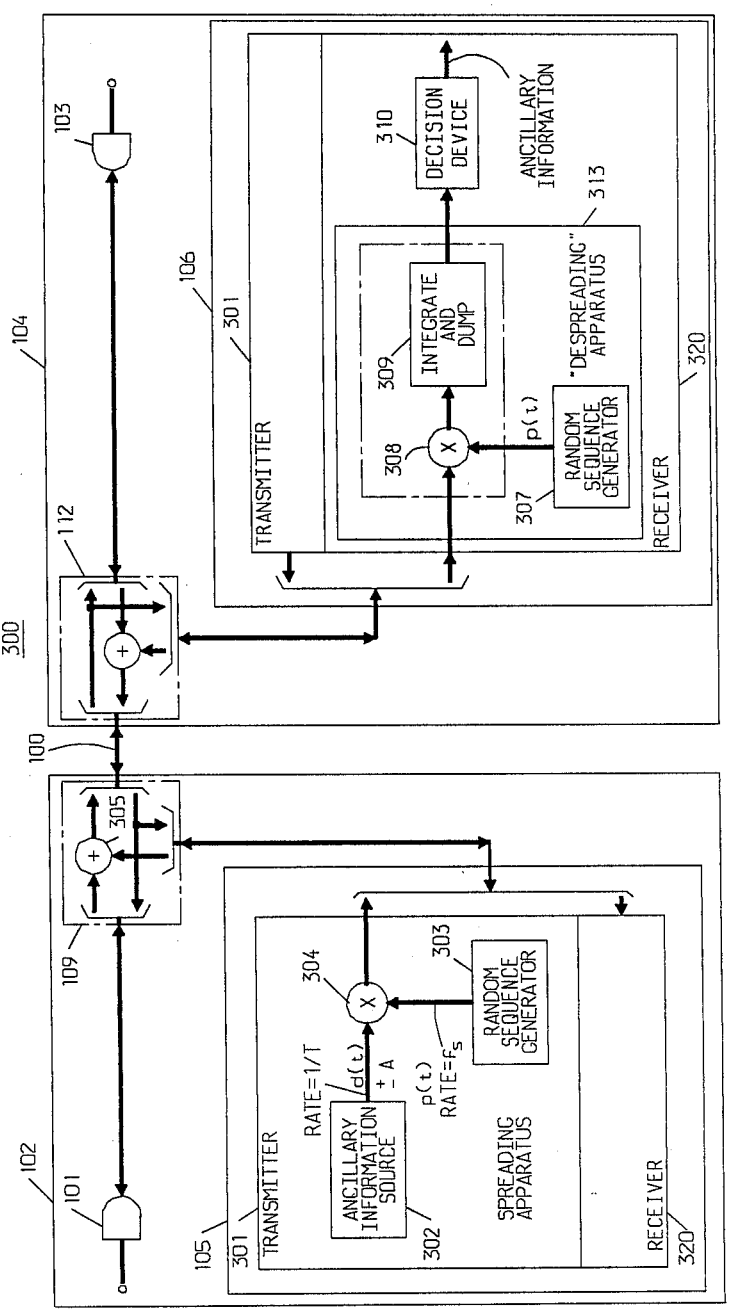
FIG. 3 is a block diagram of a baseband communications system utilizing the present invention.

FIGS. 1 and 2, described hereinabove, reflect a somewhat simplified representation of a communications system which incorporates the present invention. A more detailed description of an embodiment of the present invention for baseband communications is shown in FIG. 3. For purposes of consistency with the prior drawing figures, components which provide the function previously described in FIGS. 1 and 2 will bear the same reference designations. The baseband communications system 300, shown in FIG. 3, incorporates a spread-spectrum signature signal along with its transmission of an associated information signal between remote locations 102 and 104 via network 100. As previously discussed, the spread-spectrum signature signal conveys an identification of the associated information signal. Both the spread-spectrum signature signal and the associated information signal convey "information." To distinguish between the content of the identification conveyed by the signature signal and that of the associated information signal, "ancillary" information will be used when referring to the content of the identification conveyed by the spread-spectrum signature signal, and the "main" information will be used when referring to the content of the associated information signal.

The spread-spectrum signature signal is formed at the transmitter 301 of signature transceiver 105 by first generating, via ancillary information source 302, a baseband signal that carries this ancillary information which is ultimately conveyed by the spread-spectrum signature signal. Source 302 supplies the ancillary information at a symbol rate of 1/T. In the illustrative embodiment of FIG. 3, this baseband signal is a binary signal, designated as d(t), whose amplitude fluctuates between some preselected values of +A and −A. This signal is then multiplied, in the time domain, by a pseudorandom sequence which "spreads" the spectrum of the baseband signal over a significantly larger frequency band. One such sequence, designated as p(t) and having a "chip" rate of $f_s$, is provided by pseudorandom sequence generator 303 and multiplication of this sequence by d(t) is provided by multiplier 304. The resulting spread-spectrum signal at the output of multiplier 304 is then added to the associated information signal using adder 305 in node 109. This associated information signal conveys main information and is generated by information signal transceiver 101. The output of adder 305 is transmitted through the network 100.

Within the receiver 320 of signature transceiver 106, the arriving associated information signal is processed in conventional fashion within information signal transceiver 103 to extract the main information. The phrase "in conventional fashion" means using well-known techniques and is also meant to emphasize one of the key advantages of the use of a spread-spectrum signature signal in accordance with the invention. This advantage is that such use does not alter the processing applied to generate or receive the associated information signal. Accordingly, information signal transceiver 103 incorporates whatever steps would be performed in the absence of the use of a spread-spectrum signature signal. To recover the ancillary information carried by the signature signal, the incoming signal, i.e., the associated information signal and superimposed spread-spectrum signature signal, is routed through a "despreading" operation which boosts the spectrum of the spread-spectrum signature signal above that of the associated information signal. This despreading operation is well-known and is provided in FIG. 3 by random sequence generator 307, multiplier 308 and integrate and dump apparatus 309. Generator 307 is synchronized to its counterpart 303 in signature transceiver 105 using well-known techniques to produce the sequence p(t) in the receiver. The integrate and dump apparatus accumulates the output of multiplier 308 until some prescribed level is reached and then couples its output to decision device 310. Device 310 recovers the ancillary information by comparing its input against one or more preselected threshold values. For example, in the case of the illustrative binary signal, it is preferable to use threshold values of ±k, where k is an appropriately chosen scalar quantity. This ancillary information which identifies the associated information signal can then be used for any of the numerous purposes herein described. Generator 307, multiplier 308 and dump apparatus 309, collectively referred to as despreading apparatus 313, can be replaced by a "matched" filter having an impulse response p(−t). Use of such a filter does not require synchronization between signature transceivers 105 and 106.

Figure 4:
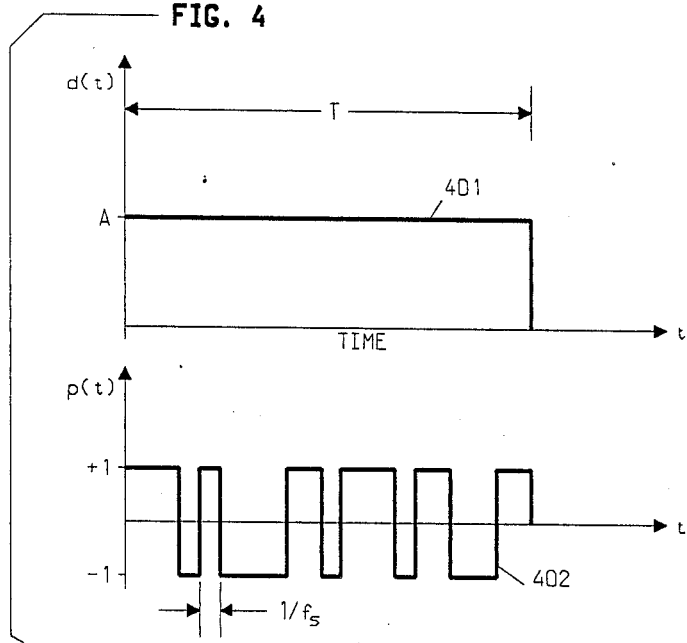
FIGS. 4 and 5 are graphical depictions of illustrative waveforms useful for understanding the operation of the present invention.
Figure 5:
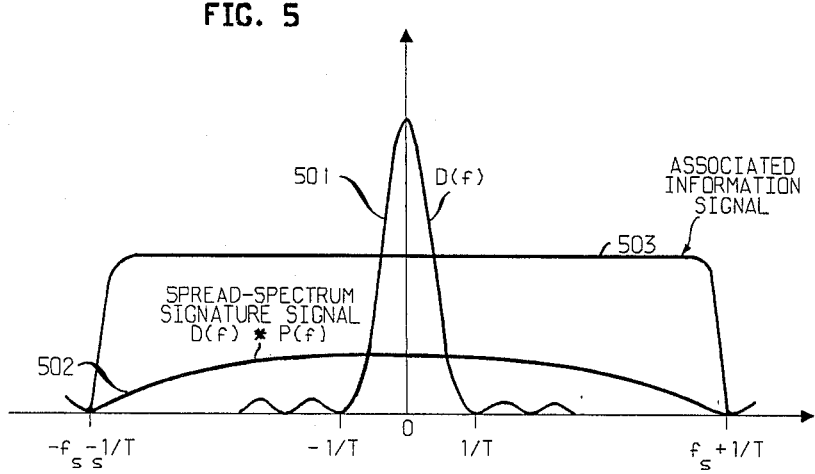

FIGS. 4 and 5 show waveforms which are useful for understanding the operation of the present invention. Waveform 401 depicts the ancillary information signal d(t) in the time domain which has an amplitude value of +A during the illustrated bit period. During this period, the pseudorandom sequence p(t) in this domain varies between amplitude values of plus or minus 1. This sequence would be repeated in subsequent bit periods. The duration, $1/f_s$, of the shortest pulse in the illustrated time domain is called a "chip" and determines the amount of spreading in the frequency domain. In FIG. 5, curves 501 and 502 show the frequency spectra D(f) and D(f)*P(f) of the ancillary information signal d(t) and that of the spread signal, d(t) multiplied by p(t), respectively. The asterisk (*) deontes a mathematical convolution in the frequency domain between the spectrum D(f) and the spectrum P(f) of p(t). Note the significantly lower energy level of the spread signal and the fact that it extends over a significantly larger frequency range than that of the ancillary information signal. Note also that the amplitude level of the spread signal 502 is significantly less than that of the main information signal 503. This low amplitude level of the spread signal advantageously allows the associated information signal receiver to operate without noticeable degradation.

Figure 6:
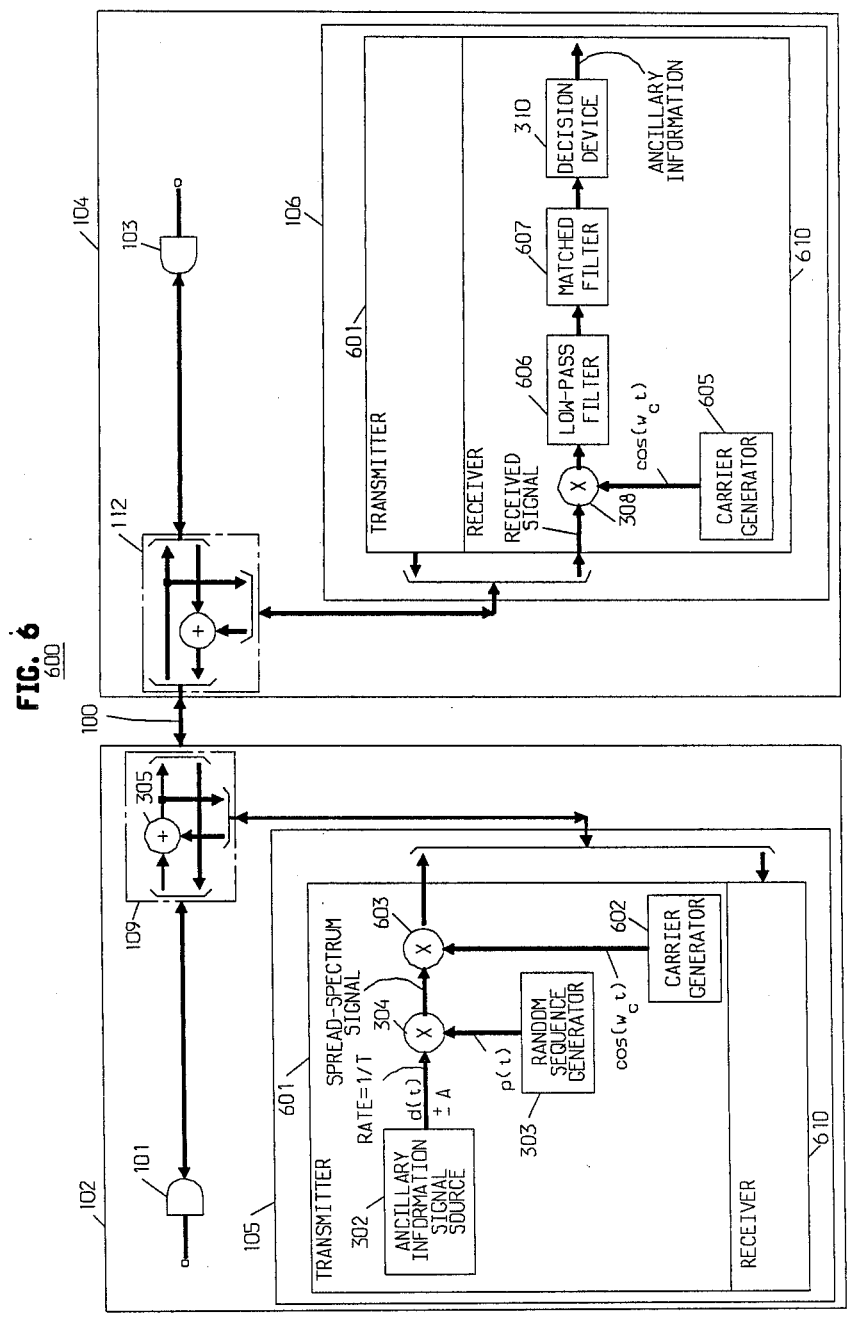
FIG. 6 is a block diagram of a passband communications system utilizing the present invention.

As mentioned supra, the present invention can be implemented in either baseband or passband communications systems. FIG. 6 shows one illustrative passband communications system 600 which incorporates the present invention. For this application, each of signature transceivers 105 and 106 comprises a transmitter 601 and receiver 610. Transmitter 601 and receiver 610 each utilize components which are identical in structure and function to those in the previous drawing figures and which bear the same reference designation. In this regard, note that the transmitter 601 in FIG. 6 is similar to transmitter 301 in FIG. 3 but for the addition of carrier signal generator 602 which generates the sinusoidal carrier signal cos ($w_c t$). This carrier signal is modulated by the spread-spectrum signature signal at the output of multiplier 304 via multiplier 603. The modulated carrier signal is then added to the associated information signal using adder 305 before being transmitted through network 100.

At remote location 104, the associated information signal is processed using a conventional information signal transceiver for passband communications. The signature signal can be recovered within the receiver 610 of signature transceiver 106 by first demodulating it using multiplier 308 and the carrier signal formed by carrier signal generator 605. Second order harmonics in this demodulated signal are removed by low-pass filter 606 whose output is then despread using matched filter 607. Filter 607 provides the same function as multiplier 308, random sequence generator 307 and integrate and dump apparatus 308 in FIG. 3; namely, boosting the signal energy of the ancillary information signal to a level significantly greater than that of the associated information signal. Once this is done, the ancillary information can be recovered using decision device 310.

It should, of course, be noted that while the present invention has been described in terms of several illustrative embodiments, other arrangements will be apparent to those of ordinary skill in the art. For example, while the embodiments of the present invention have been described in reference to discrete functional elements, the function of one or more of these elements can be provided by one or more appropriately programmed general-purpose processors, or special-purpose integrated circuits, or digital signal processors, or an analog or hybrid counterpart of any of these devices. In addition, while FIG. 6 shows the spreading of the output of ancillary information signal source 302 prior to modulation, the order of the spreading and modulation operations can be interchanged. This interchanging may be desirable for certain applications or for facilitating implementation of a particular modulation scheme for the signature signal, such as differential phase shift keying. Interchanging the order of spreading and modulation from that in FIG. 6 may require a change in the position of matched filter 607 from that shown in FIG. 6 to one preceding multiplier 308. Also, while the circuitry of the signature transceivers in FIGS. 3 and 6 have been described with reference to remote locations 102 and 104, identical circuitry can be used in the signature transceivers within telephone network 100. Finally, while the embodiments of FIGS. 3 and 6 disclose systems wherein information signals are transmitted in two directions through a telephone network, the present invention is not restricted to such networks or to a certain system topology, e.g., a specific number of remote locations, or to bidirectional communications between such locations. Indeed, the present invention may be used within any unidirectional or bidirectional communication system, and, in the latter case, the information rate of the transmitted information and/or signature signals need not be the same in each direction.

I claim:

1. A communications system comprising
means for transmitting a spread-spectrum signature signal superimposed upon an associated nonspread-spectrum information signal, said spread-spectrum signal conveying information which identifies the associated information signal;
means for receiving said information signal and superimposed spread-spectrum signature signal; and
means responsive to the received spread-spectrum signature signal for recovering the identifying information.

2. The communications system of claim 1 wherein said recovering means also includes means for assigning said associated information signal to one of a plurality of communications modes in response to the identifying information recovered from said spread-spectrum signature signal.

3. The system of claim 2 wherein said assigning means routes said associated information signal to one of a plurality of communications facilities.

4. The system of claim 2 wherein said assigning means causes said associated information signal to bypass predetermined communications apparatus.

5. The system of claim 2 wherein said assigning means selectively disables at least one of a plurality of communications apparatus.

6. The system of claim 2 wherein said assigning means maintains a record of the assigned communications mode.

7. The system of claim 2 wherein said assigning means routes said associated information signal to different ones of a plurality of similar communications apparatus.

8. The system of claim 2 wherein said assigning means generates a signal which inhibits future transmission of said associated information signal.

9. The system of claim 2 wherein said assigning means alters an operating characteristic of said receiving means.

10. The system of claim 2 wherein said assigning means also alters an operating characteristic of said transmitting means.

11. The system of claim 2 wherein said operating characteristic is the rate at which said information signal and superimposed spread-spectrum signature signal is transmitted.

12. The system of claim 1 wherein said transmitting means includes means for generating said spread-spectrum signature signal.

13. The system of claim 12 wherein said generating means includes a pseudorandom sequence generator.

14. The system of claim 1 wherein said transmitting means includes means for superimposing said spread-spectrum signature signal upon said associated information signal.

15. The system of claim 1 wherein receiving means includes a random sequence generator.

16. The system of claim 1 wherein said receiving means includes a decision device which compares a signal to a predetermined threshold.

17. The system of claim 1 wherein said transmitting means transmits said associated information signal and superimposed spread-spectrum signature signal as a baseband signal.

18. The system of claim 1 wherein said transmitting means transmits said associated information signal and superimposed spread-spectrum signature signal as a passband signal.

19. A communications method comprising the steps of
transmitting a spread-spectrum signature signal superimposed upon an associated nonspread-spectrum information signal, said spread-spectrum signal conveying information which identifies the associated information signal;
receiving said information signal and superimposed spread-spectrum signature signal; and
recovering the identifying information from the received spread-spectrum signal.

20. A transmitter for a communications system comprising
means for receiving a nonspread-spectrum information signal and generating a spread-spectrum signal conveying information which identifies said information signal, and means responsive to said spread-sprectrum signal and said information signal for superimposing said spread-spectrum signal onto said information signal.

21. A method comprising the steps of
receiving a nonspread-spectrum information signal, generating a spread-spectrum signal conveying information which identifies said information signal, and superimposing said spread-spectrum signal onto said information signal.

22. A receiver for a communications system comprising
means for receiving a nonspread-spectrum information signal and a superimposed spread-spectrum signal, said spread-spectrum signal conveying information which identifies said information signal, and
means responsive to the superimposed spread-spectrum signal for recovering the identifying information therein.

23. A method comprising the steps of
receiving a nonspread-spectrum information signal and a superimposed spread-spectrum signal, said spread-spectrum signal conveying information which identifies said information signal, and
recovering the identifying information in said spread-spectrum signal.

* * * * *